(12) United States Patent
Mizui

(10) Patent No.: US 6,201,883 B1
(45) Date of Patent: Mar. 13, 2001

(54) TOPOGRAPHY MEASURING DEVICE

(75) Inventor: Seiichi Mizui, Odawara (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/233,548

(22) Filed: Jan. 20, 1999

(30) Foreign Application Priority Data

Jan. 22, 1998 (JP) .................................. 10-010690

(51) Int. Cl.$^7$ ...................................... G06K 9/00
(52) U.S. Cl. ........................................ 382/109; 382/106
(58) Field of Search ..................... 382/100, 104, 382/106, 109, 154, 108, 153; 702/1, 2, 5, 14, 127, 150, 152, 153, 179, 180, 181, 189, 198; 356/3, 4.01, 20, 376; 901/1, 47

(56) References Cited

U.S. PATENT DOCUMENTS

| | | | |
|---|---|---|---|
| 5,528,888 | * 6/1996 | Miyamoto et al. | 56/10.2 |
| 5,644,318 | * 7/1997 | Janky et al. | 342/357 |
| 5,774,826 | * 6/1998 | McBride | 701/207 |
| 5,899,957 | * 5/1999 | Loomis | 701/214 |
| 5,938,704 | * 8/1999 | Torii | 701/23 |
| 5,984,475 | * 11/1999 | Galiana et al. | 351/209 |
| 5,986,604 | * 11/1999 | Nichols et al. | 342/357.12 |
| 6,009,359 | * 12/1999 | El-Hakim et al. | 701/28 |
| 6,052,647 | * 4/2000 | Parkinson et al. | 701/215 |

\* cited by examiner

*Primary Examiner*—Andrew W. Johns
*Assistant Examiner*—Shervin Nakhjavan
(74) *Attorney, Agent, or Firm*—Greer, Burns & Crain, Ltd.

(57) ABSTRACT

A topography measuring device which comprises a visual camera mounted on a vehicle for measuring a distance to subject topographical features to be measured; an absolute position detecting unit mounted on the vehicle for detecting a three-dimensional absolute position of the vehicle; a topographical coordinate measuring unit for determining three-dimensional position data on the subject topographical features of a vehicle coordinate system based on the image pickup data by the visual camera; a coordinate conversion unit for converting the three-dimensional position data on the subject topographical features of the vehicle coordinate system determined by the topographical coordinate measuring unit using detected data of the absolute position detecting unit into three-dimensional position data of an absolute coordinate system; an image pickup position instructing unit for instructing the vehicle on a plurality of different vehicle positions for taking the images of the subject topographical features by the image pickup unit; and a topographical data producing unit for producing topographical data on the subject topographical features by synthesizing the conversion data of the coordinate conversion unit based on the image pickup data of the visual camera at the plurality of different vehicle positions instructed by the image pickup position instructing unit, whereby topographical features of a mine, ground, working face and the like where the vehicle cannot move can be measured efficiently.

4 Claims, 8 Drawing Sheets

BEFORE EXCAVATION

AFTER EXCAVATION

EARTH VOLUME

TOPOGRAPHY MEASURING DEVICE

TECHNICAL FIELD

The invention relates to a topography measuring device for producing data on the entire subject topographical features to be measured, such as a mine or excavation site, with the use of a vehicle.

BACKGROUND ART

At mine and quarry sites, information on the topographical features of the sites is important for excavation scheduling and production control. Therefore, a vehicle provided with GPS was conventionally travelled at the site of excavation to obtain three-dimensional position data, and the obtained three-dimensional position data was used to measure topographical features.

Although such a method can measure the features of the ground surface where the vehicle can travel but cannot measure the features of the ground or working face to be excavated or worked.

The present invention was achieved in view of the circumstances described above. It is an object of the invention to provide a topography measuring device which can efficiently measure the topographical features of a mine, ground, working face or the like where the vehicle cannot travel.

DISCLOSURE OF THE INVENTION

The invention according to claim 1 relates to a topography measuring device which comprises: visual camera means mounted on a vehicle for measuring a distance to subject topographical features to be measured; absolute position detecting means mounted on the vehicle for detecting a three-dimensional absolute position of the vehicle; topographical coordinate measuring means for determining three-dimensional position data on the subject topographical features of a vehicle coordinate system based on image pickup data of the visual camera means; coordinate conversion means for converting the three-dimensional position data of the vehicle coordinate system of the subject topographical features determined by the topographical coordinate measuring means using detected data of the absolute position detecting means into three-dimensional position data of an absolute coordinate system; image pickup position instructing means for instructing the vehicle on a plurality of different vehicle positions for taking images of the subject topographical features by the image pickup means; and topographical data producing means for producing topographical data on the subject topographical features by synthesizing the conversion data of the coordinate conversion means based on the image pickup data of the visual camera means at the plurality of different vehicle positions instructed by the image pickup position instructing means.

In the invention according to claim 1, three-dimensional position data on the subject topographical features of the vehicle coordinate system is determined based on the image pickup data of the visual camera means mounted on the vehicle, and the three-dimensional position data is converted into three-dimensional position data of the absolute coordinate system based on the output of the absolute position detecting means mounted on the vehicle. A field of vision of the visual camera means is changed by moving the vehicle position to take pictures of different areas of the subject topographical features, three-dimensional position data on the respective areas of the absolute coordinate system obtained from the image pickup data is synthesized to obtain data on the entire shape of the subject topographical features.

Thus, according to the invention corresponding to claim 1, the three-dimensional position data on the subject topographical features of the vehicle coordinate system obtained from the image pickup data of the visual camera means is converted into the absolute coordinate system. Therefore, the subject topographical features of the images of different areas can be synthesized very easily, and the entire image of the subject topographical features can be obtained readily.

The invention according to claim 2 detects a posture angle of the vehicle body, compensates for the detected segment of the posture angle to determine three-dimensional position data on the subject topographical features of the absolute coordinate system. Thus, data on the shape of the subject topographical features can be obtained more accurately.

In the invention according to claim 3, the image pickup positions are instructed to the vehicle so that the images of the subject topographical features can be taken successively in a direction along the ground surface. Therefore, the image data do not have a largely overlapped portion or any intervals, and the entire image of the subject topographical features can be obtained efficiently.

The invention according to claim 4 calculates an earth volume excavated on the basis of data on the topographical features before and after the excavation. Therefore, an excavated volume can be judged from the calculated volume. Namely, since a work load at the construction site is often determined based on not a weight but a volume, the invention is a useful method for determining the work load.

BRIEF DESCRIPTION OF THE DRAWINGS

FIGS. 11(*a*) to 11(*c*) are diagrams for illustrating a method for managing an earth volume.

DESCRIPTION OF THE PREFERRED EMBODIMENTS

Embodiments of the invention will be described in detail with reference to the accompanying drawings.

Figure 1:
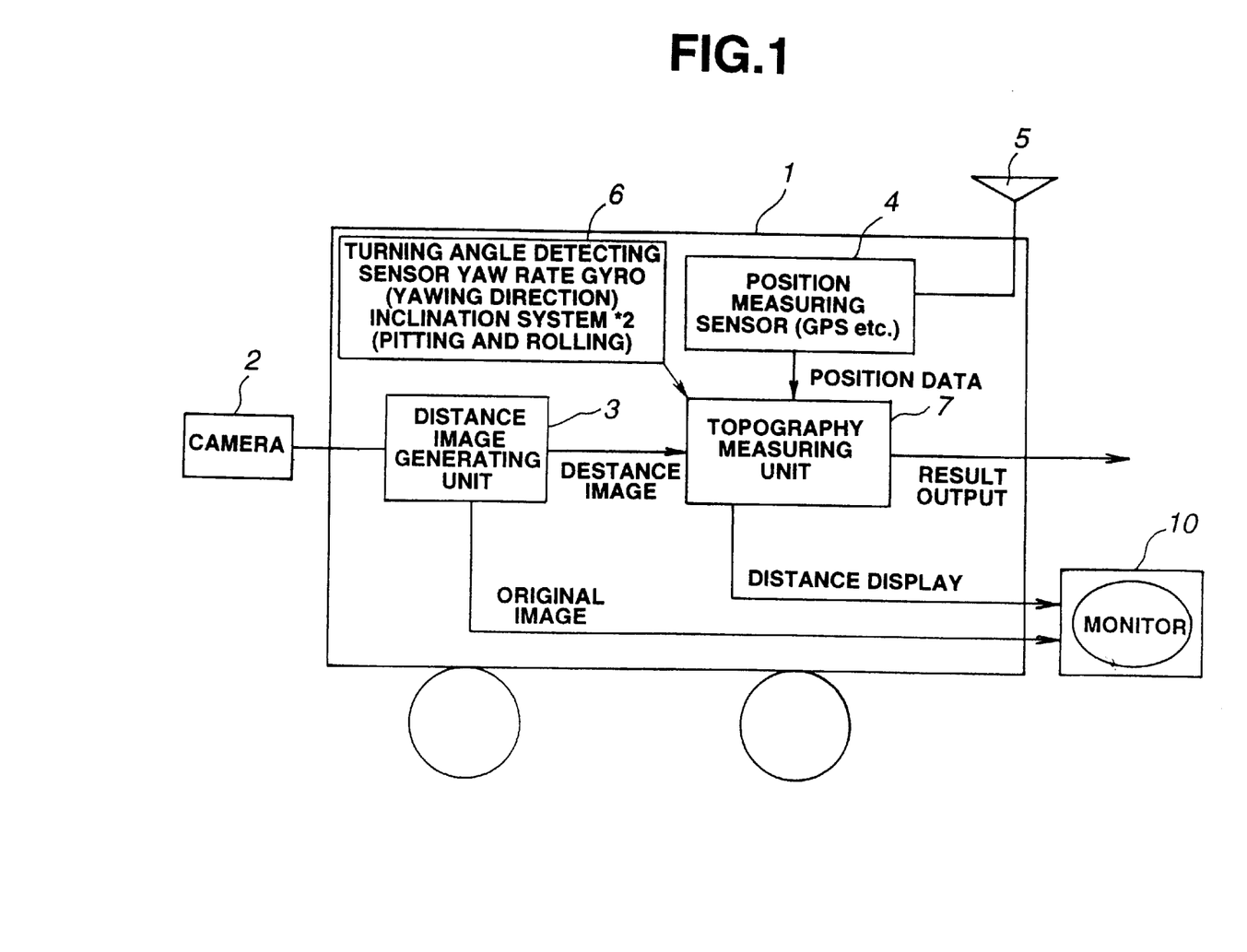
FIG. 1 is a block diagram showing an embodiment of the invention.

FIG. 1 shows a vehicle 1 on which a topography measuring device is mounted. The vehicle 1 may be travelled automatically, by remote controlling or under direct control by man. But, it is required to have at least a navigation function using GPS (global positioning system) or the like.

The vehicle 1 in this embodiment is manned to travel and has a GPS monitor for GPS navigation. The GPS monitor shows a map which represents a location where the vehicle is travelling on the map.

Topographical features to be measured are determined to be a working face of the ground.

The vehicle 1 in FIG. 1 is provided with camera 2 as a visual camera means in order to monitor the entire three-dimensional features of the ground as the original image and to measure a three-dimensional position of the ground against the vehicle 1. In this case, a distance to the ground is measured by a stereoscopic method utilizing parallax of two cameras or a multiocular camera.

Figure 2:
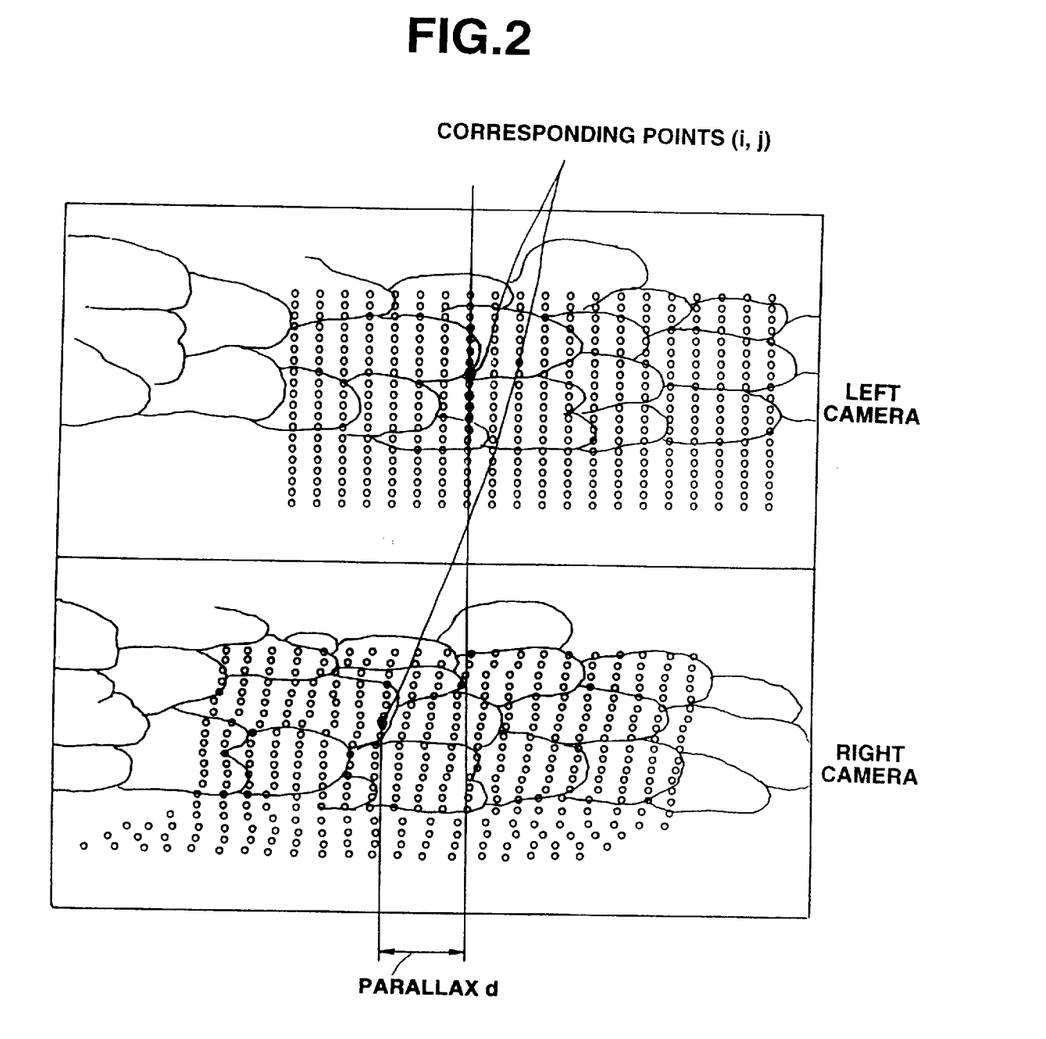
FIG. 2 is a diagram for illustrating a principle of measuring a distance by a stereo camera method (stereophotography)

Specifically, where the vehicle 1 has two cameras, the upper half of FIG. 2 shows topographical features whose image is picked up by a left camera, and the lower half of FIG. 2 shows the same topographical features whose image is picked up by a right camera. For example, a plurality of dot matrixes (i, j) are determined for the left camera image. And a method such as pattern matching is used to find which dot of the right camera image corresponds to the image of one dot (i, j) of the left camera image. And, when the corresponding point has been determined, the positions of both the dots on the images are determined, and their parallax d is determined. Distance data from the dot (i, j) to a line segment connecting the cameras is determined using a distance between both the cameras and the focal distances of the cameras in addition to the parallax d. Such processing is repeated on each dot to determine distance data.

Distance image generating device 3 calculates distance data to the ground as described above. Distance data d on every (i, j) pixel obtained as described above is converted into gradation data according to distance d and output to monitor 10, which displays a distance image. The monitor 10 has the original image taken by the camera 2 and can display both the distance image and the original image.

Figure 3:
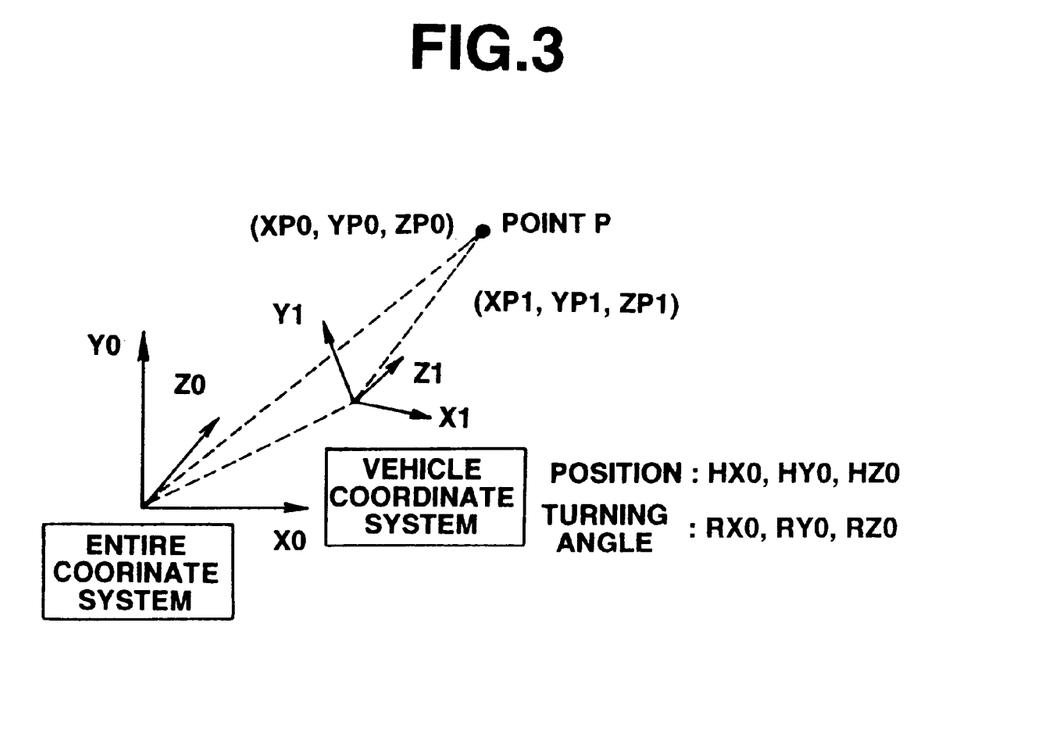
FIG. 3 is a diagram showing a relationship between a vehicle body coordinate system and an absolute coordinate system.

As described above, the distance image generating device 3 converts distance image data related to the three-dimensional information of (i, j, d) into three-dimensional coordinate data (Xp1, Yp1, Zp1) of vehicle body coordinate system X1-Y1-Z1 with a predetermined position of the vehicle 1 as the original point as shown in FIG. 3.

Position measuring sensor 4 detects a three-dimensional position of the vehicle 1. In this case, a GPS receiver is used as the position measuring sensor 4. Specifically, the position measuring sensor 4 detects the original position (HX0, HY0, HZ0) of the vehicle body coordinate system X1-Y1-Z1 as shown in FIG. 3. The three-dimensional position data detected by the GPS receiver is input via antenna 5. Based on the data obtained by the GPS receiver, an area map where the vehicle 1 is travelling is shown on the monitor 10, and the position of the travelling vehicle 1 can be indicated on the map.

Turning angle detecting sensor 6 comprises, for example, a yaw rate gyro which detects a turning angle of the body of the vehicle 1 in a yawing direction and two inclinometers which detect a pitching angle and a rolling angle of the vehicle body, and detects turning angles, namely a posture, of the vehicle body in three directions based on the detected results. In other words, when it is assumed that X0-Y0-Z0 is the absolute coordinate system (entire coordinate system) in FIG. 3, the turning angle detecting sensor 6 outputs a turning angle (RX0, RY0, RZ0) of the vehicle body representing the turning angle of the vehicle body coordinate system X1-Y1-Z1 with respect to the entire coordinate system X0-Y0-Z0.

Topography measuring section 7 performs mainly the following three processing.

(a) The three-dimensional position data of the vehicle body coordinate system of the ground obtained from the distance image generating device 3 is converted into three-dimensional position data of the absolute coordinate system by using output from the turning angle detecting sensor 6 and the position measuring sensor 4.

(b) Data on the entire topographical features of the ground is obtained by synthesizing topographical data on the ground at a plurality of locations picked up by the camera 2.

(c) The vehicle position (image pickup vehicle position) for successively taking pictures of the ground is calculated. The calculated image pickup vehicle position is displayed on the navigation map on the monitor 10.

Figure 4:
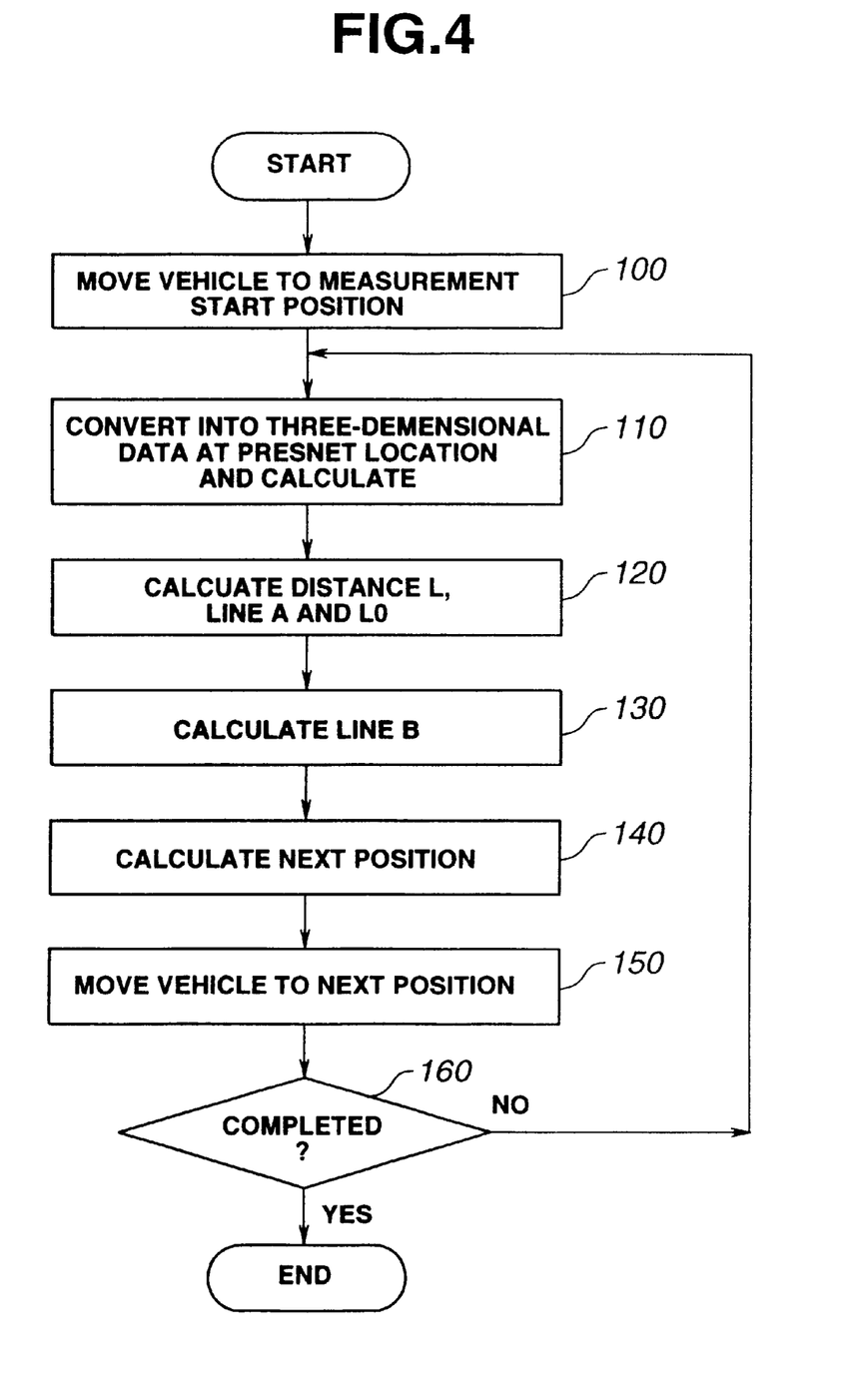
FIG. 4 is a flowchart showing a procedure of measuring topographical features.

A procedure of measuring the topographical features of the ground will be described with reference to the flowchart of FIG. 4.

Figure 5:
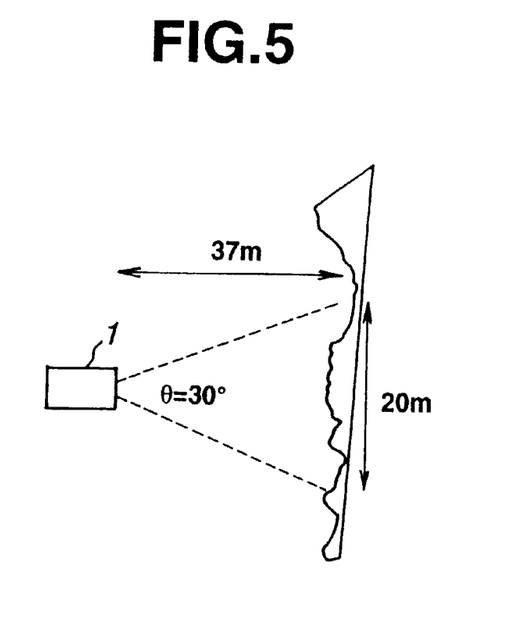
FIG. 5 is a diagram showing a positional relationship between subject topographical features to be measured and a stereo camera.

First, the vehicle 1 is moved to the measurement start position before a working face of the ground (step 100). As shown in FIG. 5, when the working face having a width of 20 m is photographed by the camera 2 having an angle of view of 30 degrees, a distance of 37 m or more is required. And, the vehicle can be moved to reach a distance of 37 m while watching a distance image on the monitor 10.

When the vehicle goes to the measurement start position, the ground is photographed by the camera 2. The topography measuring section 7 converts the three-dimensional position data of the vehicle body coordinate system of the ground obtained from the distance image generating device 3 into three-dimensional position data of the absolute coordinate system by using output from the turning angle detection sensor 6 and the position measuring sensor 4 as described below.

Specifically, as shown in FIG. 3, three-dimensional coordinate data (Xp1, Yp1, Zp1) of point p of the vehicle body coordinate system X1-Y1-Z1 can be converted into a coordinate position (Xp0, Yp0, Zp0) on the absolute coordinate system X0-Y0-Z0 by using a turning angle (RX0, RY0, RZ0) input from the turning angle detecting sensor 6 and the original position (HX0, HY0, HZ0) of the vehicle body coordinate system X1-Y1-Z1 input from the position measuring sensor 4 as indicated by the following expression (1).

$$\begin{bmatrix} XP0 \\ YP0 \\ ZP0 \end{bmatrix} = MR0 * \begin{bmatrix} XP1 \\ YP1 \\ ZP1 \end{bmatrix} + \begin{bmatrix} HX0 \\ HY0 \\ HZ0 \end{bmatrix} \quad (1)$$

In the expression (1) above, MR0 is a turning matrix of the vehicle body coordinate system and represented by the following expression (2) by using the turning angle of the vehicle body.

$$MR0 = \begin{bmatrix} COS(RX0), & SIN(RX0), & 0 \\ -SIN(RX0), & COS(RX0), & 0 \\ 0, & 0, & 1 \end{bmatrix} * \quad (2)$$

-continued $$\begin{bmatrix} \cos(RY0), & 0, & -\sin(RY0) \\ 0, & 1, & 0 \\ \sin(RY0), & 0, & \cos(RY0) \end{bmatrix} * \begin{bmatrix} 1, & 0, & 0 \\ 0, & \cos(RZ0), & \sin(RZ0) \\ 0, & -\sin(RZ0), & \cos(RZ0) \end{bmatrix}$$

By performing the processing of the expression (1) on each pixel of the distance image, three-dimensional position data of the absolute coordinate system of the topographical features photographed from the first image pickup position can be determined (step 110).

The next imaging point to continuously measure the topographical features of the ground is calculated.

Figure 6:
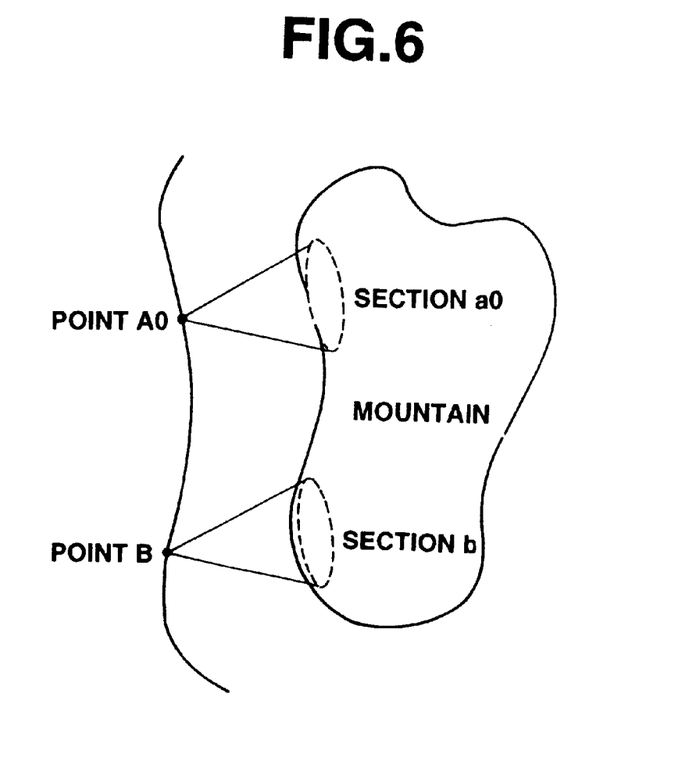
FIG. 6 is an explanatory diagram to measure intermittently.

Specifically, if the next image pickup point is not determined properly, there occurs an area not photographed or an excessively large overlapped area between image pickup area a0 and the next image pickup area b as shown in FIG. 6. Therefore, the topographical features cannot be measured efficiently.

Figure 7:
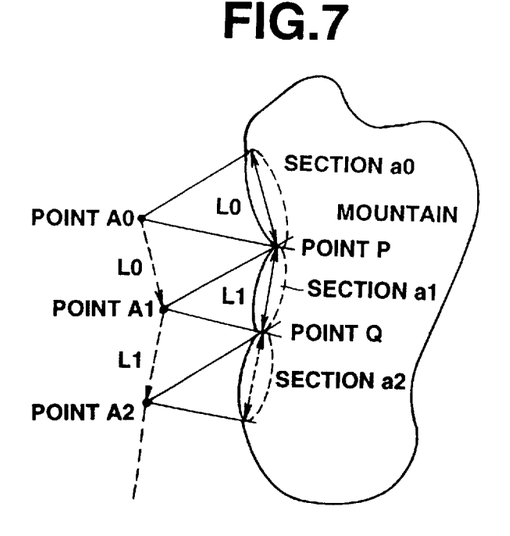
FIG. 7 is an explanatory diagram to measure successively.

Therefore, in this embodiment, image pickup points AO, A1, A2, . . . capable of photographing successively are determined sequentially as shown in FIG. 7, and the vehicle 1 is moved to the determined imaging points to take pictures.

Specifically, the procedure is performed as follows.

Figure 8:
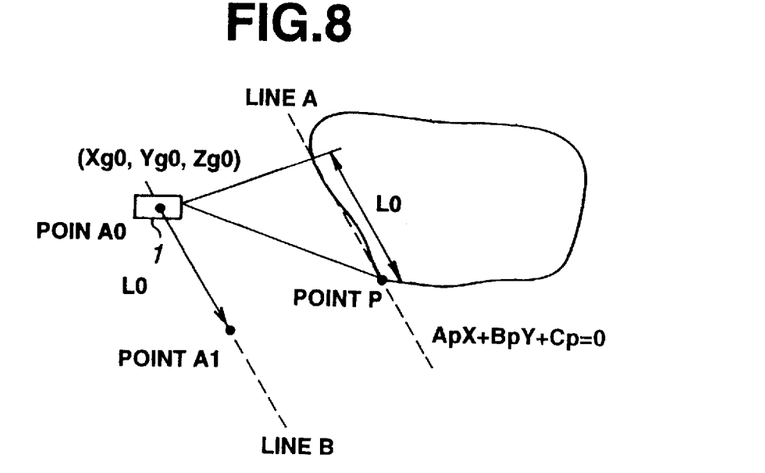
FIG. 8 is a diagram for illustrating a method to determine the next image pickup point in order to measure successively.
Figure 9:
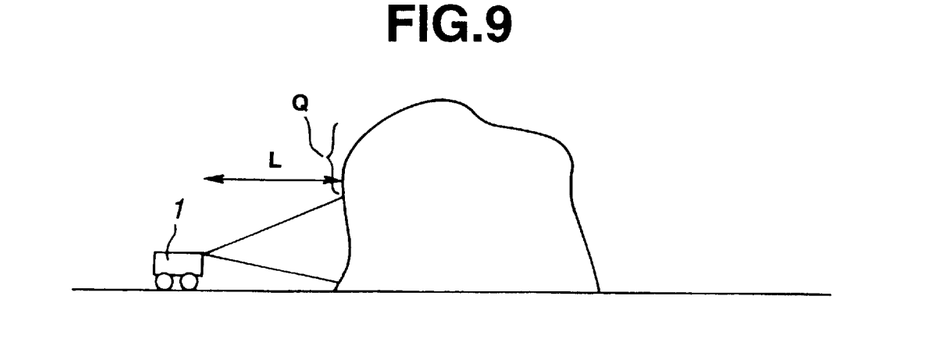
FIG. 9 is a diagram for illustrating distance L between a camera and a subject to be measured.

As shown in FIG. 8, average distance L to the ground photographed from the first image pickup point is determined based on the distance image photographed from the first image pickup point A0 (Xg0, Yg0, Zg0) or the three-dimensional position data of the absolute coordinate system determined in step 110 described above (see FIG. 9).

Measuring width LO is then determined, and an expression of linear line A approximating to the surface of the ground is determined.

The three-dimensional position data on the ground of the vehicle body coordinate system obtained from the distance image generating device 3 is compensated using the vehicle body turning angle (RX0, RY0, RZ0) obtained from the turning angle detecting sensor 6. In other words, as shown in FIG. 3, the three-dimensional coordinate data (Xp1, Yp1, Zp1) at point P of the vehicle body coordinate system X1-Y1-Z1 is converted into a coordinate position (Xp2, Yp2, Zp2) as indicated by the following expression (3) by using the turning angle (RX0, RY0, RZ0) input from the turning angle detecting sensor 6.

$$\begin{bmatrix} XP2 \\ YP2 \\ ZP2 \end{bmatrix} = MR0 * \begin{bmatrix} XP1 \\ YP1 \\ ZP1 \end{bmatrix} \tag{3}$$

Figure 10:
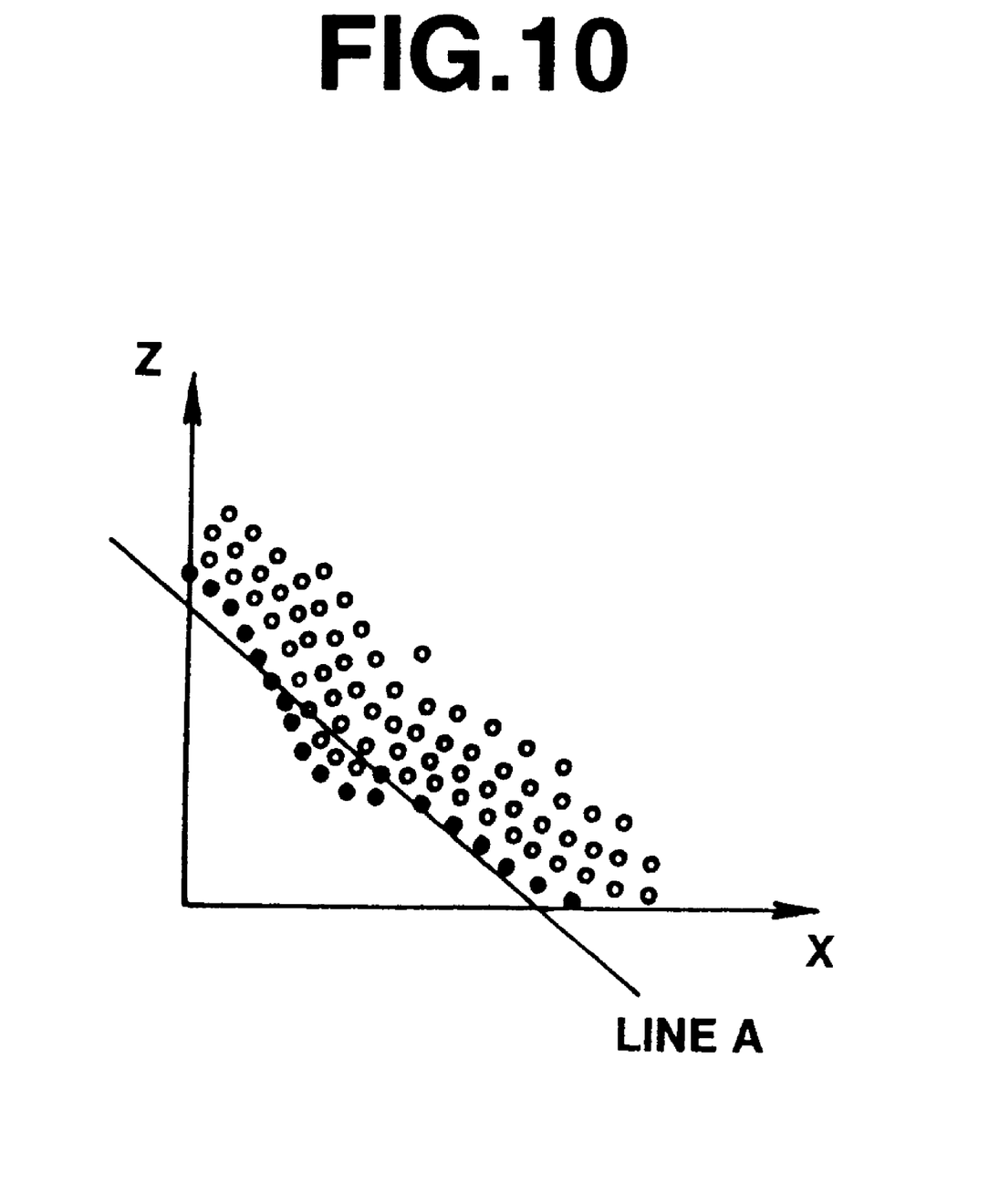
FIG. 10 is an explanatory diagram for determining a direction to move a vehicle in order to determine the next image pickup point.

The converted data is projected onto plane Z-X. At the time, the distance image of a part in a predetermined range in a direction of height Y may be projected. For example, direction Y is determined to fall in a range of 0 to 10 m to which an excavator reaches. Direction Z corresponds to a direction of the distance taken by the camera 2, direction X to a horizontal direction, and direction Y to a vertical direction. As a result, it is assumed that a projection image is obtained as shown in FIG. 10. The bottom points are selected (black circle) in direction Z in the projection image. The bottom points are linearly approximated by a method of least squares or the like to determine an expression of linear line A as follows.

$$ApX+BpZ+D=0 \tag{4}$$

By adding components X, Z of the vehicle body position data input from the position measuring sensor 4 to expression (4), an expression of line A of the absolute coordinate system can be determined as indicated by the following expression (5).

$$Ap(X+HX0)+Bp(Z+HZ0)+D=0 \tag{5}$$

The measuring width L0 can be calculated by determining coordinates at both ends of the data on the bottom points of FIG. 10 and determining a distance between the coordinates (step 120).

After determining the measuring width L0 and the approximate expression A of the surface of the subject topographical features measured, line B which is parallel to line A running through the first image pickup point A0 (Xg0, Yg0, Zg0) is determined, and a point which is distance L0 away from point A0 on the linear line B is determined as the next image pickup point A1.

Specifically, the line B running through A0 (Xg0, Yg0, Zg0) is expressed by the following expression (6).

$$ApX+BpZ-(ApXg0+BpZg0)=0 \tag{6}$$

Coordinates X, Z of the next image pickup point A1 is expressed by the following expression (7) (steps 130, 140).

$$X = Xg0 + L0 \cdot \frac{Bp}{\sqrt{Ap^2 + Bp^2}} \tag{7}$$

$$Z = Zg0 - L0 \cdot \frac{Ap}{\sqrt{Ap^2 + Bp^2}}$$

Upon calculating the position of the next image pickup point A1 as described above, the next image pickup point A1 is shown on the navigation monitor of the monitor 10 based on the position data.

With reference to the display, the driver drives the vehicle to the next imaging point A1 (step 150).

The procedure described above is repeated until all areas of the ground are measured (step 160).

The topography measuring section 7 synthesizes topographical data on the multiple areas photographed from the different image pickup points obtained as described above to produce the topographical data on the entire ground. Since topographical data on each area is indicated on the absolute coordinate system, such data can be synthesized quite simply, and the image of the entire topographical features measured can be obtained with ease.

In this embodiment, the image pickup points for the successive image pickup of the ground in a direction along the surface of the earth are calculated continuously, and the vehicle is moved along the image pickup points to take images of the topographical features. Therefore, image data do not overlap largely or have intervals, and the image of the entire topographical features can be obtained efficiently.

In the embodiment above, moving distance L0 to the next image pickup point was determined so that a plurality of measuring areas are successive without overlapping at all. And, in order to prevent the measured areas from being spaced due to an error in the measured data, the moving distance L0 may be determined to be, for example, 0.9×L0 so to slightly overlap the measured areas.

And, an angle of the camera 2 itself or the vehicle body 1 in the horizontal direction may be varied so that the boundary (e.g., point P in FIG. 8) with the next measuring area measured from image pickup point A0 does not fail to fall in a field of vision of the camera when taking the image from the next image pickup point A1. At the time, since the respective coordinates of position A0, point P and position A1 and an angle of view of the camera 2 are known, such data may be used to calculate an angle of the camera 2 or an angle of the vehicle body so that point P can be caught in the field of vision of the camera from the image pickup point A1.

As shown in FIG. 6, where there is an unmeasured area, measured data on such a part may be compensated by interpolation calculation or the like.

When the topographical features to be measured are too high to take the image of the top area of the subject topographical features by a single image pickup operation (area Q in FIG. 9), the angle of the camera 2 is changed toward upward to take the image of the top area. At the time, a sensor for detecting a change θc in turning angle of the camera 2 in a vertical direction may be mounted, and the turning matrix indicated by the expression (2) is expressed as the following expression (8) to make the coordinate conversion calculation of the expression (1).

$$MR0 = \begin{bmatrix} \cos(RX0), & \sin(RX0), & 0 \\ -\sin(RX0), & \cos(RX0), & 0 \\ 0, & 0, & 1 \end{bmatrix} *  \begin{bmatrix} \cos(RY1), & 0, & -\sin(RY1) \\ 0, & 1, & 0 \\ \sin(RY1), & 0, & \cos(RY1) \end{bmatrix} * \begin{bmatrix} 1, & 0, & 0 \\ 0, & \cos(RZ0), & \sin(RZ0) \\ 0, & -\sin(RZ0), & \cos(RZ0) \end{bmatrix} \quad (8)$$

A difference between the expression (2) and the expression (8) is the replacement of RY0 with RY1. In this case, RY1=RY0+θc.

Thus, since the three-dimensional position data obtained by changing the angle of the camera 2 vertically is also the absolute coordinate system, it can be synthesized with the three-dimensional position data in the lower measurement area with ease.

Figure 11A:
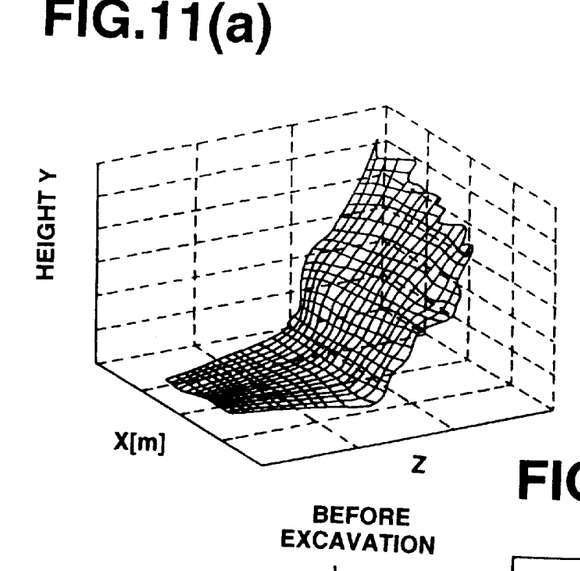
Figure 11B:
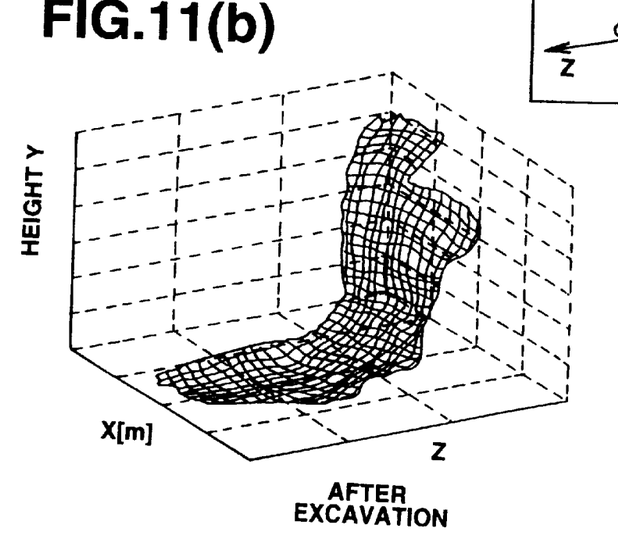
Figure 11C:
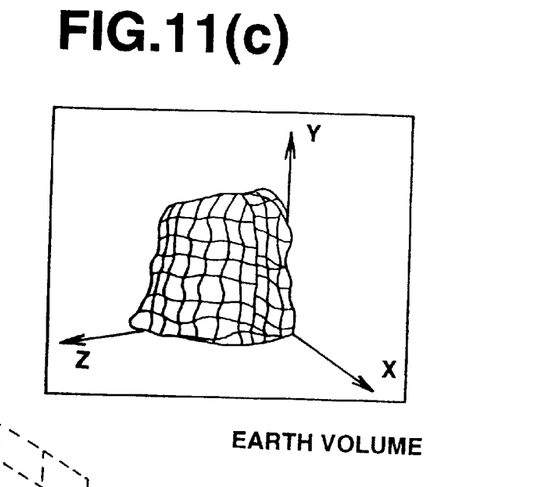

By obtaining the three-dimensional position data on the working face, which can be obtained as described above, before and after the excavation, an earth volume can be calculated easily from the obtained data as shown in FIG. 11.

Specifically, FIG. 11(a) shows a three-dimensional shape of the working face before excavation, while FIG. 11(b) shows a three-dimensional shape of the working face after the excavation. Volumes of the working face before and after the excavation are determined from data on the respective three-dimensional shapes, and a difference between them can be calculated to determine an earth volume of the pertinent excavation. Shape data on the actually excavated part can also be obtained from the three-dimensional shapes of the working face before and after the excavation as shown in FIG. 11(c). And, an earth volume may be calculated from shape data on the part where excavation was actually made. The earth volume is generally calculated by adding up the weights of dump trucks loaded with earth and sand. In this case, however, the excavated earth volume is calculated based on the shape of the working face to be excavated, so that even when excavation and loading works are performed many times, a total earth volume can be determined readily at a time by measuring the first working face state and the final working face state.

Besides, three-dimensional position data on the working face obtained as described above may be measured every day or every several days and stored to obtain data of excavation records, which are quite useful for excavation scheduling and process controlling.

Where the vehicle 1 of the embodiment is travelled by remote controlling or automatically, at least the stereoscopic camera 2, the position measuring sensor 4 such as GPS, the turning angle detecting sensor 6 and the distance image generating device 3 are mounted on the vehicle and their data are transmitted to a base station by radio. Thus, the components such as the topography measuring section 7 and the monitor 10 can be omitted from the vehicle 1.

In the above embodiment, the vehicle was manned to travel and the respective image pickup points were displayed on the GPS monitor mounted on the vehicle. But, if the vehicle is remotely controlled, the respective image pickup positions may be indicated on a remote control panel. And, where the vehicle is automatically travelled, it is not necessary to show the respective image pickup positions on the monitor in order to move the vehicle. It is sufficient by instructing an automatic travel control system of the vehicle on the calculated image pickup positions.

The vehicle 1 may be an excavator such as a power shovel or a wheel loader, on which the components shown in FIG. 1 may be mounted.

What is claimed is:

1. A topography measuring device, comprising:
   visual camera means mounted on a vehicle for measuring a distance to subject topographical features to be measured;
   absolute position detecting means mounted on the vehicle for detecting a three-dimensional absolute position of the vehicle;
   topographical coordinate measuring means for determining three-dimensional position data on the subject topographical features of a vehicle coordinate system based on image pickup data of the visual camera means;
   coordinate conversion means for converting the three-dimensional position data of the vehicle coordinate system of the subject topographical features determined by the topographical coordinate measuring means using detected data of the absolute position detecting means into three-dimensional position data of an absolute coordinate system;
   image pickup position instructing means for instructing the vehicle on a plurality of different vehicle positions for taking images of the subject topographical features by the image pickup means; and
   topographical data producing means for producing topographical data on the subject topographical features by synthesizing the conversion data of the coordinate conversion means based on the image pickup data of the visual camera means at the plurality of different vehicle positions instructed by the image pickup position instructing means.

2. The topography measuring device according to claim 1, further comprising posture angle detecting means for detecting a posture angle of the vehicle, wherein the coordinate conversion means converts the three-dimensional position data on the subject topographical features on the vehicle coordinate system determined by the topographical coordinate measuring means into three-dimensional position data of the absolute coordinate system by using the detection output of the posture angle detecting means and the detection data of the absolute position detecting means.

3. The topography measuring device according to claim 1, wherein the image pickup position instructing means calculates a next vehicle position for successively taking the images of the subject topographical features in a direction along a surface of the earth by using the conversion data of the coordinate conversion means based on the image pickup data at the vehicle position and successively instructs the vehicle on the calculated vehicle positions.

4. The topography measuring device according to claim 1, further comprising earth volume calculating means for calculating an earth volume excavated according to topographical data produced before and after the excavation by the topographical data producing means.

* * * * *